(12) United States Patent
Kummeth

(10) Patent No.: US 7,944,105 B2
(45) Date of Patent: May 17, 2011

(54) SYNCHRONOUS MACHINE HAVING MAGNETIC BEARINGS EXCITED BY THE ROTOR

(75) Inventor: Peter Kummeth, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 308 days.

(21) Appl. No.: 12/373,169

(22) PCT Filed: Jun. 27, 2007

(86) PCT No.: PCT/EP2007/056431
§ 371 (c)(1),
(2), (4) Date: Jan. 9, 2009

(87) PCT Pub. No.: WO2008/006699
PCT Pub. Date: Jan. 17, 2008

(65) Prior Publication Data
US 2009/0280990 A1 Nov. 12, 2009

(30) Foreign Application Priority Data
Jul. 12, 2006 (DE) .................. 10 2006 032 344

(51) Int. Cl.
*H02K 1/22* (2006.01)
*H02K 7/09* (2006.01)
*H02K 9/19* (2006.01)
*H02K 55/04* (2006.01)

(52) U.S. Cl. .......... 310/90.5; 310/54; 505/163; 505/166

(58) Field of Classification Search .................. 310/54, 310/90.5; 505/163, 166, 876, 877
See application file for complete search history.

(56) References Cited

U.S. PATENT DOCUMENTS

| 5,325,009 A | * | 6/1994 | Capion et al. ........... 310/216.122 |
| 6,770,994 B2 | * | 8/2004 | Kozoriz .................. 310/90.5 |
| 6,777,841 B2 | * | 8/2004 | Steinmeyer ............. 310/90.5 |
| 2005/0151437 A1 | | 7/2005 | Ramu |
| 2009/0280990 A1 | * | 11/2009 | Kummeth ................ 505/166 |
| 2010/0026121 A1 | * | 2/2010 | Nakashima et al. ........ 310/90.5 |

FOREIGN PATENT DOCUMENTS

| DE | 103 05 604 A1 | | 8/2003 |
| JP | 1055037 A | | 3/1989 |
| JP | 2008157388 A | * | 7/2008 |
| WO | WO 2008078718 A1 | * | 7/2008 |

* cited by examiner

*Primary Examiner* — Quyen Leung
*Assistant Examiner* — David W. Scheuermann
(74) *Attorney, Agent, or Firm* — Henry M. Feiereisen; Ursula B. Day

(57) ABSTRACT

A superconductive synchronous machine having superconductive magnetic bearings. A superconductor (6) on the stator side as a first bearing part is disposed opposite from a second bearing part (12) on the rotor side, the second being part being magnetically and mechanically connected via a flux feed section (11) to the pole core (9) of the rotor. A superconductive exciting coil (10) in the rotor pole core (9) excites both the pole core (9) and the second bearing part (12). In order to cool the superconductive exciting coil (10), coolant feeds (16, 16', 24, 25) are provided, which are sealed in relation to the rotor shaft (8, 8') by ferrofluid seals (26). The power for the exciting coil is fed via slip rings (21) or by being inductively connected (29) at the rotor shaft (8').

16 Claims, 2 Drawing Sheets

SYNCHRONOUS MACHINE HAVING MAGNETIC BEARINGS EXCITED BY THE ROTOR

BACKGROUND OF THE INVENTION

The invention relates to a synchronous machine comprising a rotor, which is mounted in two magnetic bearings against a stator having stator windings and has a rotor shaft and, fastened thereto, a pole core in which magnetic field-generating excitation coils are arranged, which either interact with the stator windings to generate rotation of the rotor or serve to generate current in the stator by rotation of the rotor, each bearing comprising a first bearing part which is arranged on or in the stator and is cooled by means of a cryostat and has a high-temperature superconductor structure, and a second bearing part on the rotor side, the first bearing part interacting during operation of the bearing with the magnetized second bearing part which is separated from the first bearing part by a gap, in order to act as a bearing.

The rotor shaft of such synchronous machines, for example motors or generators, are either set in rapid motion by the interaction between the stator windings and the excitation coils, or otherwise rotated so that a current is induced in the stator windings. In order to allow. maximally wear-free, passive bearing, the rotor shaft is mounted in two high-temperature superconductor magnetic bearings, which lie for example next to the pole core in the radial direction.

Such high-temperature superconductor bearings comprise a first and a second bearing part, the first bearing part comprising a high-temperature superconductor structure i.e. a bulk high-temperature superconductor material, which is cooled to below the critical temperature ($T_c$) by means of a cryostat. In the synchronous machine of the type mentioned in the introduction, this first bearing part is arranged on the stator and interacts with a second bearing part, which is separated from the first bearing part by a gap. The second bearing part is magnetized at least during operation of the bearing, the magnetic field being introduced into the gap. Radial movement of the second bearing part therefore leads to a variation of the magnetic field inside the high-temperature superconductor structure. Since superconductors are however (approximately) ideal conductors, a reaction force is created which attempts to prevent or reverse this magnetic field variation. The second bearing part, and therefore the rotor shaft, are thereby held in the position originally set.

For example permanent magnets, in particular made of NdFeB, may be used for the second bearing part. The magnet quality, in particular the maximum magnetic field achievable by such permanent magnets, is however restricted, so that the supporting force and performance capacity of the high-temperature superconducting bearing is limited. Furthermore, the materials of the permanent magnets, in particular NdFeB, are often found to be brittle so that the maximum achievable rotation speed is also restricted. To this end it has been proposed to provide additional bandages on the second bearing part, although these disadvantageously constitute an additional component which also increases the distance between the first bearing part and the second bearing part.

As an alternative, it has been proposed to use superconducting coils instead of the permanent magnets in the second bearing part. These superconducting coils must however be additionally cooled, so that additional cost is entailed and additional friction losses occur since the refrigerant and a current connection must be fed to these coils.

SUMMARY OF THE INVENTION

It is therefore an object of the invention to provide a better possibility than this for magnetizing the second bearing part.

In order to achieve this object in a synchronous machine of the type mentioned in the introduction, according to the invention a magnetic flux generated by means of the excitation coils can be drawn off by flux feed sections into the second bearing parts which are separated axially from the pole core.

According to the invention, a part of the magnetic flux generated anyway during operation by the excitation coils is to be fed to the second bearing part, in order to magnetize it and introduce the required magnetic flux into the gap.

Additional components generating a magnetic field are therefore no longer required for magnetic field generation in the second bearing part, since the magnetic field generated anyway by the excitation coils is used both for the driving function and for the bearing function. This obviates the need to introduce permanent magnets, which means that the performance and supporting capacity of the bearing is no longer limited by the magnet quality, and the maximum rotation speed is no longer limited by the brittleness of the permanent magnet. It furthermore obviates the introduction of additional superconducting coils into the second bearing part, which means that an expensive superconducting strip conductor material and the additional cooling instrument are obviated with the superconducting bearing coils.

The losses of the high-temperature superconductor bearings are furthermore no longer determined by the homogeneity of the permanent magnet magnetization in the circumferential direction, so that lower-loss high-temperature superconductor bearings can be produced.

Start-up of the synchronous machine may then take place in a plurality steps. First, before the start-up of the magnetic bearings, the rotor shaft must be taken and held by a holding device. For start-up, the first bearing parts are then initially cooled. After the temperature of the high-temperature superconductor structure has fallen below the critical temperature, the excitation coils in the pole core are energized. The magnetic field is thereby generated, and the magnetic flux magnetizes the second bearing parts. In this way, the magnetic bearing is activated automatically by energizing the excitation coils, so that the holding device can be removed. The synchronous machine can then correspondingly be put into operation. For operation as a motor, the stator windings are supplied with a current which generates a rotating field. The rotor shaft is thereby driven. During operation as a generator, the rotor is driven and a corresponding current is induced in the stator windings.

Advantageously, the rotor shaft of the synchronous machine does not need to be moved in order to activate the magnetic bearing. The bearing is put into operation automatically by energizing the excitation coils. With the described activation of the high-temperature superconductor bearing, high supporting forces are achieved since the high-temperature superconductor structure is not exposed to a magnetic field before start-up. The high-temperature superconductor structure is therefore exposed to a large change in the magnetic field when the bearing is activated.

Specifically, the second bearing parts may for example be formed by pole core disks which are coupled to the pole core through the flux feed section. The coupling of the second bearing parts, which of course consist of a magnetizable material, preferably the same material as the pole core, is carried out by likewise magnetizable i.e. magnetic flux-conducting flux feed sections, which are preferably coupled to the pole-carrying regions of the pole core. These are regions in which a particularly large magnetic flux occurs, i.e. the regions in which the north and south poles of the pole core are respectively formed when the excitation coils are energized.

The pole core, the flux feed sections and the pole core disks may form a monobloc component or be connected by means of fastening elements. The version as a monobloc component ensures that good flux conduction through the magnetizable material is guaranteed, including to the pole disks. Such a monobloc component may be manufactured for example by producing the complete component by means of a suitable mould, although it is also conceivable for the individual components to be welded retrospectively or machined from solid material.

Expediently, the second bearing part lies at a distance from the pole core which is greater than the width of the gap between the first and second bearing parts. This will prevent a magnetic short circuit from forming between the second bearing part, in particular the pole core disk, and the pole core, in such a way that the magnetic flux drawn off does not emerge through the gap but instead is returned into the pole core, so that a high supporting force is ensured by complying with said distance criteria.

The rotor shaft may also be configured in various ways. On the one hand, it is conceivable for the flux feed section also to form a supporting connection between the second bearing part and the pole core, so that it is sufficient to use a non-continuous rotor shaft which is respectively connected to the second bearing parts. It is however also conceivable to use a continuous rotor shaft, which is then connected in particular both to the second bearing parts and directly to the pole core. In this case, the rotor shaft is designed nonmagnetically so that a magnetic short circuit via the rotor shaft is also prevented.

While the second bearing parts are of course configured axisymmetrically, the flux feed sections are provided only in particular regions for connecting the pole core to the second bearing part, where a magnetic flux can be drawn off. In this case, two different configurations may be envisaged. Thus, the flux feed sections may be arranged mirror-symmetrically with respect to the radial plane of the rotor shaft. When using an excitation coil, the axis of which conventionally lies in this radial plane, this means that magnetic flux is drawn off through both flux feed sections from the north pole or the south pole of the field existing in the pole core when the excitation coils are energized. Owing to the independence of the two bearings, however, this is not relevant for their supporting capacity. As an alternative, the flux feed sections may also be arranged point-symmetrically in relation to the midpoint of the pole core. Then, with similarly arranged excitation coils, flux is drawn off in one case from the region of the north pole, and in the other case from the region of the south pole. This embodiment is particularly advantageous, since imbalances on the rotor are counteracted.

In addition to radial bearing of the rotor, axial bearing is also desirable. For this reason, an outer surface profile of the second bearing part having indentations may particularly advantageously be provided in order to inhomogenize the magnetic field in the axial direction. The effect achieved by this profiling of the second bearing part, in particular the pole disk, is that the magnetic flux does not emerge uniformly into the gap, but instead flux variations occur in the axial direction. Then, moreover, even in the event of an axial displacement of the rotor inside the high-temperature superconductor structure, field variations occur which are opposed by corresponding forces. Besides the radial stiffening, axial stiffening is also achieved. In particular, at least one circumferential indentation groove may be formed on the outer surface of the second bearing part, so as to obtain a serrated outer surface profile.

Often, the excitation coils are also designed superconductively. In this case, the superconducting excitation coils may be arranged in at least one cryostat arranged inside the pole core, or at least one cryostat enclosing at least the pole core. It is preferable that the cryostat for the excitation coils should be arranged inside the pole core, since a short distance between the stator windings and the rotor, or first bearing part and second bearing part, can then be achieved and a low refrigerating power is required overall. In both cases mentioned so far, the cryostat co-rotates as part of the rotor. It is, however, also conceivable to use a stationary cryostat enclosing the rotor arrangement.

For a refrigerant feed/refrigerant discharge, a maximally low-friction seal should be provided. Such sealing of a refrigerant feed and a refrigerant discharge can be achieved particularly advantageously by a ferrofluid arranged on the rotor shaft and held in place by a magnetic field, A ferrofluid is in effect a magnetic liquid which can be positioned accurately in place owing to corresponding magnetic fields, which may for example be generated by means of a permanent magnet or an instrument generating a magnetic field. Such ferrofluids furthermore have low friction, so that the losses due to them can be kept small. In the case of a refrigerant feed, a refrigerant feed region is then provided in which the refrigerant can penetrate from the outside into the rotor shaft through at least one opening in the rotor shaft. This feed region is secured against leaks by a ferrofluid seal on both sides. This also applies for the discharge region, in which the refrigerant can escape in gaseous form through openings.

In a preferred exemplary embodiment, stationary tubes, routed inside the rotor shaft designed as a hollow shaft, are provided for the refrigerant feed and discharge. The tubes may advantageously be arranged concentrically in the rotor shaft, with an inner tube being enclosed by an outer tube. In this case, both tubes are part of the stator. Here again, sealing may be carried out using ferrofluids, in particular a rotary ferrofluid feed-through.

A maximally low-friction current feed to the excitation coils should furthermore be achieved. To this end a current feed to the excitation coils may be provided through an electrically conductive connection, produced by sliprings, between an electrical conductor arranged inside the rotor and a stationary electrical conductor. Small-surface coupling of the slipring is usually sufficient. As an alternative, an excitation coupling instrument may be provided. In this case, no connection is required between the conductor arranged on the rotor shaft side and the stationary conductor, since the current is transmitted here by an alternating electromagnetic field, for example in the manner of a transformer.

BRIEF DESCRIPTION OF THE DRAWING

Other advantages and details of the present invention may be found in the exemplary embodiments described below and with the aid of the drawings, in which.

DETAILED DESCRIPTION OF PREFERRED EMBODIMENTS

Figure 1:
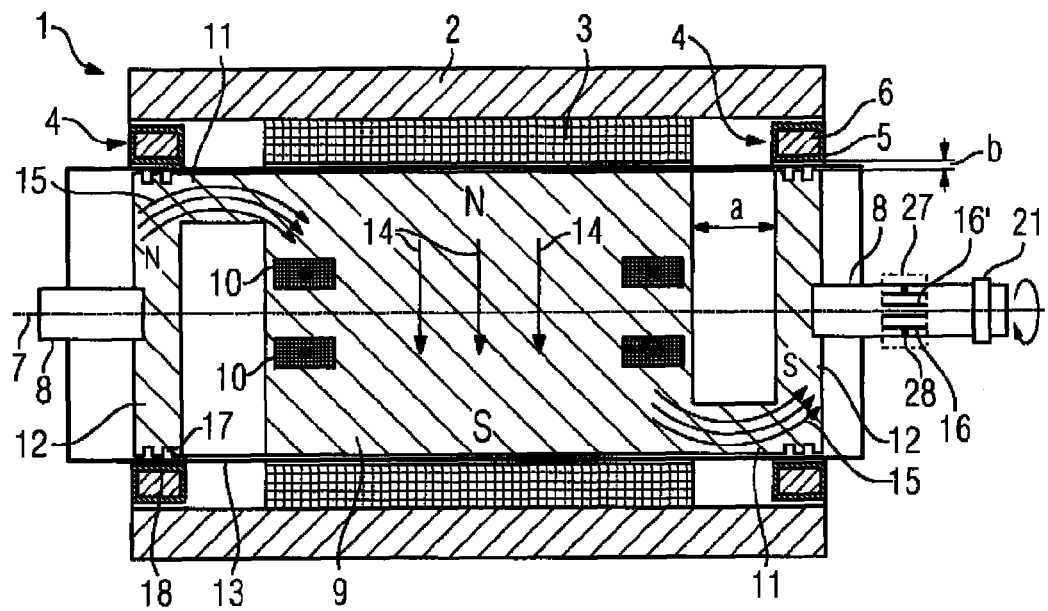
FIG. 1 shows a cross section through a synchronous machine according to a first embodiment.

FIG. 1 shows the cross section through a synchronous machine 1 according to the invention. On a stator 2, which consists for example of iron, stator windings 3 are provided as well as respectively a first annular bearing part 4 for the two high-temperature superconductor magnetic bearings, in which the rotor is mounted. The first bearing part 4 comprises a high-temperature superconductor structure 6 located inside a cryostat 5.

The rotor can rotate about a rotation axis 7 and comprises a rotor shaft 8, a pole core 9 with excitation coils 10 located therein, flux feed sections 11 and second bearing parts 12. The pole core 9, the flux feed sections 11 and the second bearing parts 12 are designed as a monobloc component, which generally consists of a material that has good magnetic flux-conducting properties. The entire rotor arrangement is contained in a further cryostat 13, since the excitation coils 10 are designed superconductively. If the excitation coils 10 are energized, then a magnetic field is generated which is symbolized by the arrows 14. A north pole N is therefore formed in the region of the pole core which is uppermost in this position of the rotor, and a magnetic south pole S is formed in the lower region. A rotating magnetic field generated by the stator windings 3 interacts with this magnetic field during operation of the synchronous machine 1 as a motor, and during operation as a generator the magnetic field generated by the excitation coils 10 generates a current in the stator windings 3 by rotation of the rotor.

The magnetic field, however, also serves for operation of the magnetic bearing formed by the first bearing part 4 and the second bearing part 12. To this end, as indicated by means of the arrows 15, magnetic flux is drawn off from the pole-carrying regions of the pole core 9 into the second bearing parts 12 through the flux feed sections 11, which are arranged point-symmetrically with respect to the midpoint of the pole core 9. These second bearing parts consequently become magnetized during operation of the excitation coils 10. The magnetized second bearing parts 12 interact with the first bearing parts 4, which are separated from them by spaces, and the cryostat 13. Any radial movement of the second bearing part 12 leads to a corrective force, as is known for high-temperature superconductor bearings.

The prerequisite for this, however, is that the flux which has been fed to the second bearing parts 12 also emerges inside the gap between the first and second bearing parts. The width b of this gap is therefore selected here to be less than the distance a between the second bearing parts 12 designed as pole core disks and the pole core 9, so that a magnetic short circuit with the pole core 9 cannot occur. A short circuit through the rotor shaft 8 is prevented anyway, since in this exemplary embodiment the latter is not designed continuously, and is therefore connected directly only to the second bearing part 12 designed as a pole core disk.

The surface of the second bearing part 12 is provided with groove-like indentations 17 in the region of the gap, so as to obtain a serrated outer surface profile 18. The magnetic field emerging into the intermediate space and entering the first bearing part 4 is therefore inhomogeneous in the axial direction, so as to obtain a magnetic field variation in the high-temperature superconductor structure 6 in the event of axial displacements of the rotor, so that restoring forces which ensure axial bearing stiffness are also created in this case.

The cryostat is connected firmly to the rotor shaft 8. Furthermore, 21 indicates a slipring which allows electrically conductive connection in order to transmit the electrical current to the excitation coils 10. As an alternative, it would also be feasible to use an excitation coupling instrument through which the current is transmitted contactlessly by means of electromagnetic fields to a conductor located in the rotor shaft 8.

A section through the rotor shaft 8, which is configured as a hollow shaft, is shown in the region 27. As may be seen, two stationary concentric tubes 16, which are used respectively for the refrigerant feed and discharge, extend inside the rotor shaft 8. The outer tube is sealed against the rotating inside of the rotor shaft 8 by a ferrofluid feed-through 28.

Figure 2:
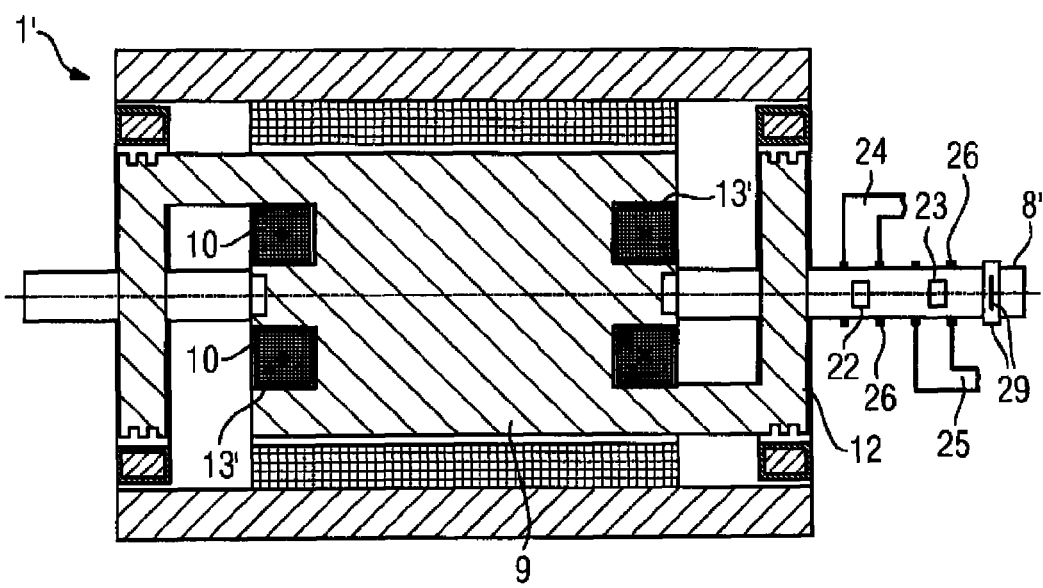
FIG. 2 shows a cross section through a synchronous machine according to a second embodiment.

FIG. 2 shows another embodiment of a synchronous machine 1', in which the rotor shaft 8' is designed continuously. This means that it is connected both to the pole core 9 and to the second bearing parts 12, which are designed as pole core disks. In this case, the rotor shaft 8' is designed nonmagnetically so that a magnetic short circuit between the second bearing parts 12 and the pole core 9 cannot occur through the rotor shaft 8'.

Another difference here from the synchronous machine 1 is that not all of the rotor arrangement is contained in a cryostat; rather, cryostats 13', which directly enclose the excitation coils 10, are provided inside the pole core 9. Since the rotor shaft 8' is designed continuously, it is readily possible to feed the refrigerant to the cryostats 13' through the rotor shaft 8' in the pole core 9. The refrigerant feed and discharge into and from the rotated rotor shaft 8' is represented schematically on the right in FIG. 2. The rotor shaft 8' respectively comprises a refrigerant feed opening 22 and a refrigerant discharge opening 23, which are connected to the corresponding line. A refrigerant feed 24 and a refrigerant discharge 25 are respectively routed to these. Both the refrigerant feed and the refrigerant discharge are sealed with seals formed by a ferrofluid 26. Liquid refrigerant is supplied through the refrigerant feed 24, and gaseous refrigerant can be taken off through the refrigerant discharge 25 by means of the refrigerant discharge opening 23.

As described with respect to the synchronous machine 1, the refrigerant feed and discharge may take place through tubes arranged concentrically in the rotor shaft, which is designed as a hollow shaft. The tubes are stationary in this case. The outermost tube is then sealed against the rotating inside of a hollow shaft by a rotary ferrofluid feed-through.

FIG. 2 likewise shows a contactless excitation coupling instrument 29 for current transmission, which consists of a component on the rotor shaft side and a component on the stator side, and through which current can be transmitted to the rotor in the manner of a transformer. As an alternative, it is naturally also possible to use sliprings in this exemplary embodiment.

Figure 3:
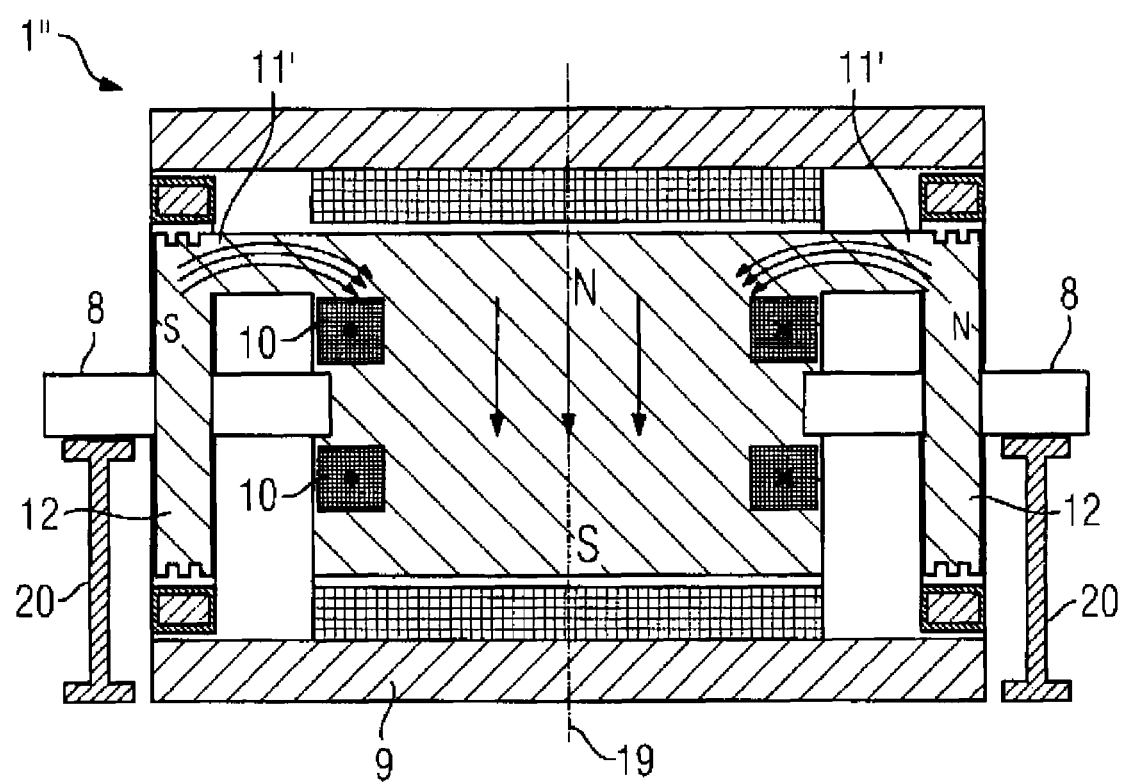
FIG. 3 shows a cross section through a synchronous machine according to a third embodiment.

FIG. 3 shows a third exemplary embodiment of a synchronous machine 1" according to the invention. In contrast to the synchronous machines 1 and 1', the flux feed sections 11' are in this case arranged symmetrically with respect to the radial plane 19 of the pole core 9, which means that both flux feed sections 11' draw off the magnetic flux from the region of the north pole of the pole core 9 into the second bearing parts 12 when the excitation coils 10 are energized. FIG. 3 furthermore shows a holding device 20, which can be used to hold the rotor when the excitation coils 10 are turned off.

What is claimed is:
1. A synchronous machine, comprising:
a stator having stator windings;
a rotor having a rotor shaft and a pole core fastened to the rotor core;
two magnetic bearings supporting the rotor against the stator, each said bearing comprising a first bearing part, which is arranged on or in the stator and cooled by a first cryostat and which has a high-temperature superconductor structure, and a second rotor-side bearing part separated from the first bearing part by a gap and separated axially from the pole core, wherein the first bearing part interacts during operation of the bearing with the second bearing part, when magnetized, to act as a bearing;

at least one magnetic field-generating excitation coil arranged in the pole core and interacting with the stator windings to generate rotation of the rotor or generating current in the stator, as the rotor rotates; and a flux feed section deflecting a magnetic flux generated by the excitation coil into the second bearing part.

2. The synchronous machine of claim 1, wherein the second bearing part is formed by a pole core disk which is coupled to the pole core through the flux feed section.

3. The synchronous machine of claim 2, wherein the pole core, the flux feed section, and the pole core disk form a monobloc component.

4. The synchronous machine of claim 2, further comprising fastening elements connecting the pole core, the flux feed section, and the pole core disk to one another.

5. The synchronous machine of claim 1, wherein the second bearing part is spaced from the pole core by a distance which is greater than a width of the gap between the first and second bearing parts.

6. The synchronous machine of claim 1, wherein the rotor shaft is nonmagnetic and connected to the pole core, said second bearing part being connected to the rotor shaft.

7. The synchronous machine of claim 1, wherein the flux feed section for the one of the two bearings and the flux feed section for the other one of the two bearings are arranged mirror-symmetrically with respect to a radial plane of the rotor shaft.

8. The synchronous machine of claim 1, wherein the flux feed section for the one of the two bearings and the flux feed section for the other one of the two bearings are arranged point-symmetrically in relation to a midpoint of the pole core.

9. The synchronous machine of claim 1, wherein the second bearing part has an outer surface provided with indentations to inhomogenize the magnetic field in an axial direction.

10. The synchronous machine of claim 9, wherein the outer surface of the second bearing part has at least one circumferential groove-like indentation to establish a serrated outer surface profile.

11. The synchronous machine of claim 1, further comprising a second cryostat arranged inside the pole core or enclosing the pole core, said the excitation coil being superconducting and arranged in the cryostat.

12. The synchronous machine of claim 11, further comprising a ferrofluid arranged on the rotor shaft and held in place by a magnetic field to seal a refrigerant feed to the second cryostat and a refrigerant discharge from the second cryostat.

13. The synchronous machine of claim 12, wherein the rotor shaft is designed as a hollow shaft, and further comprising stationary tubes provided inside the rotor shaft for the refrigerant feed and discharge.

14. The synchronous machine of claim 13, wherein the stationary tubes are arranged in concentric relationship to the rotor shaft.

15. The synchronous machine of claim 1, further comprising a current feed to the excitation coil through an electrically conductive connection, produced by a slipring, between an electrical conductor arranged inside the rotor and a stationary electrical conductor.

16. The synchronous machine of claim 15, further comprising a contactless excitation coupling instrument provided for the current feed to the excitation coil.

* * * * *